United States Patent
Farago et al.

(10) Patent No.: US 6,629,228 B1
(45) Date of Patent: Sep. 30, 2003

(54) PROPORTIONALLY GROWING STACK IN A LINEAR MEMORY ARRAY

(75) Inventors: Steven Robert Farago, Austin, TX (US); Kenneth Lee Wright, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 09/666,275

(22) Filed: Sep. 21, 2000

(51) Int. Cl.[7] .............................................. G06F 12/00
(52) U.S. Cl. ...................................... 711/170; 711/154
(58) Field of Search ................................ 711/170, 171, 711/172, 145, 154, 132; 707/100, 101; 712/202

(56) References Cited

U.S. PATENT DOCUMENTS 6,006,323 A * 12/1999 Ma et al. ..................... 712/202
6,138,210 A * 10/2000 Tremblay et al. ............ 711/132

OTHER PUBLICATIONS

Li, A Bidirectional Multiple Stack Algorithm, Dec. 1999, IEEE.*
Chien, A Dynamic Strategy for Multiple Stacks Manipulation, IEEE, Dec. 1991*
Lin, "Modified Multiple Stack Algorithm for Decoding Convolutional Codes", IEEE, vol. 4; No. 4; Aug. 1997.*
Korsh et al., "A Multiple Stack Manipulation Procedure," Nov. '83, pp 27–29, plus one page w/ ltr.
Knuth, "The Art of Computer Programming," 2d ed., vol. 1, pp240–248.
Garwick, "Data Storage in Compilers," Bit 4, 1964, pp 137–140.
Yeh et al., Dynamic Initial Allocation and Local Reallocation Procedures for Multiple Stacks, Communications of the ACM, Feb. '86, pp 30–39.

* cited by examiner

*Primary Examiner*—Kimberly McLean-Mayo
(74) *Attorney, Agent, or Firm*—Anthony V. S. England; Casimer K. Salys

(57) ABSTRACT

A method, system, and apparatus for managing data elements in a storage area is disclosed. A storage area, with a first and second end, is provided for storing data elements. The data elements are stored in a first stack, also having a first and second end. Space in the storage area for the first stack includes a first space proximate the first end of the first stack, and a second space proximate the second end of the first stack. The storing of one of the data elements in the first stack includes selecting between storing in the first space or the second space, responsive to the relative sizes of the two spaces. Data elements are also stored in the storage area in a second stack. Space available in the storage area for data elements of the second stack includes the above mentioned first and second spaces, that is, the space proximate the first end of the first stack, and the space proximate the second end of the first stack. Storing in the second stack also includes selecting between storing in the first or second space, responsive to the relative sizes of the two spaces.

15 Claims, 7 Drawing Sheets

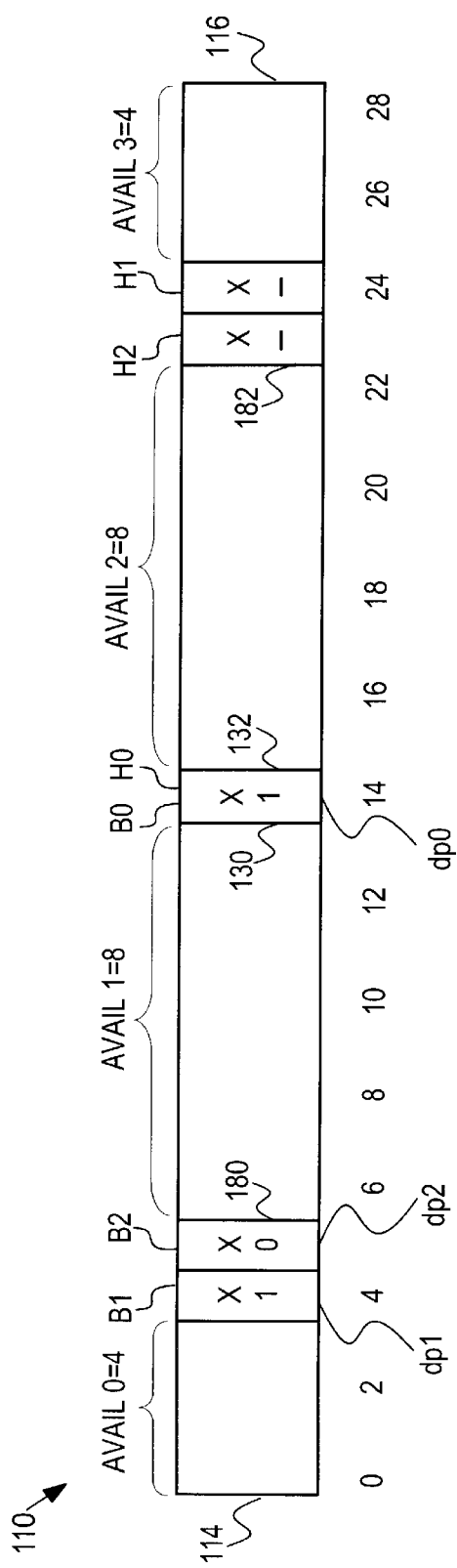
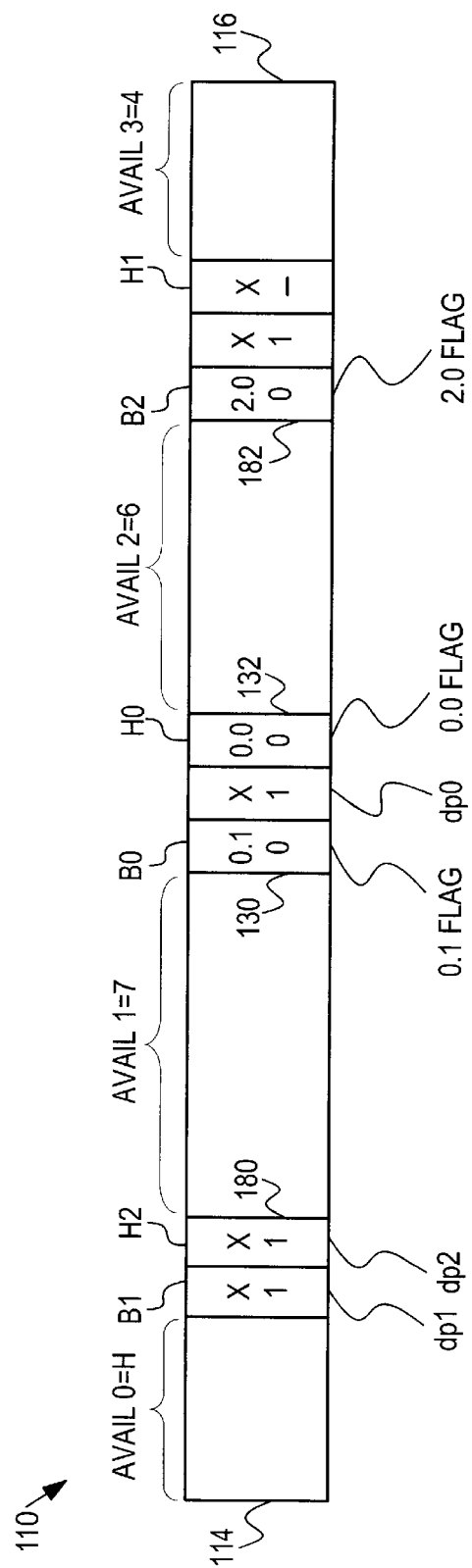
FIG. 1A
FIG. 1B

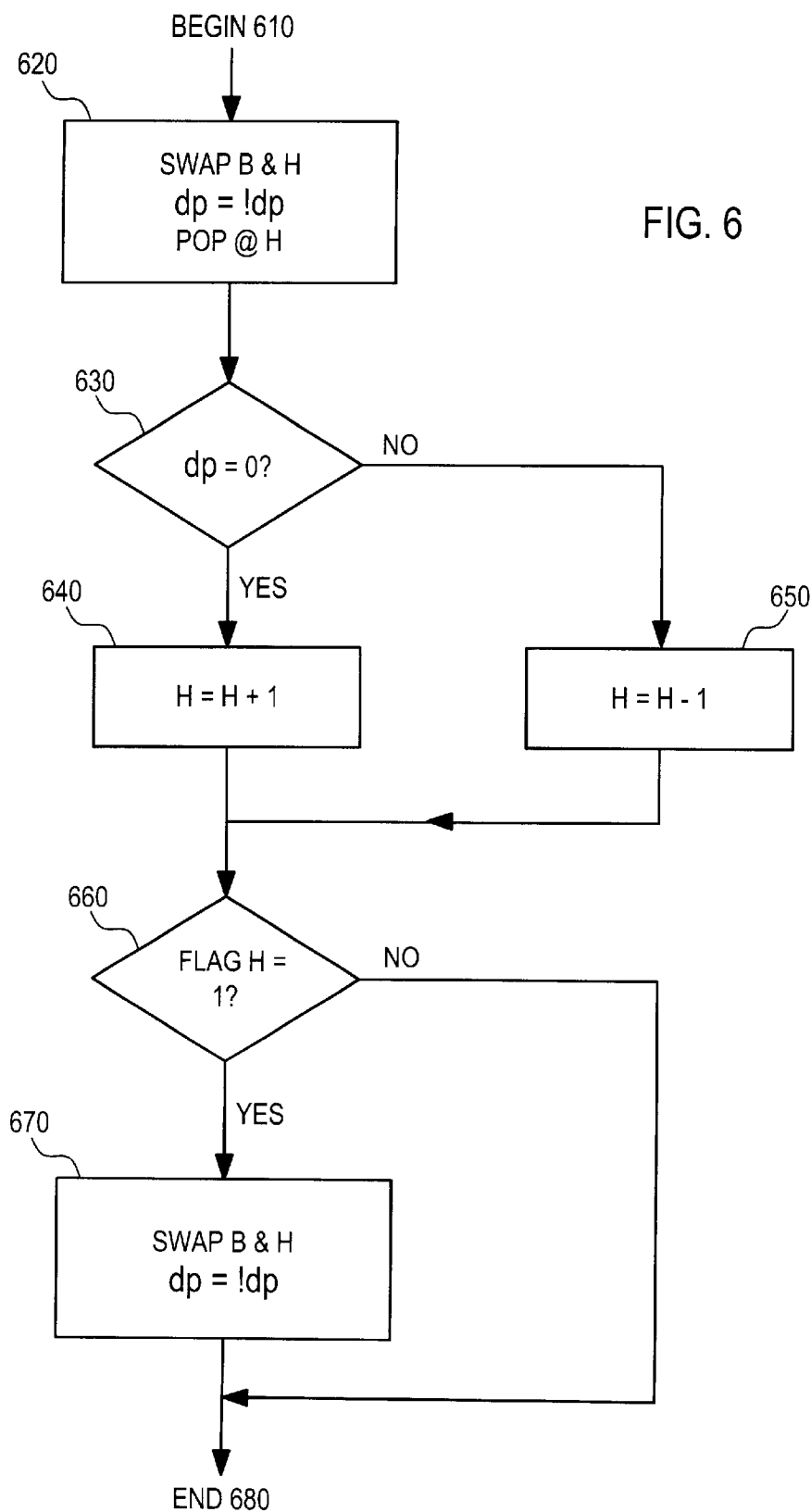

PROPORTIONALLY GROWING STACK IN A LINEAR MEMORY ARRAY

CROSS REFERENCE TO RELATED APPLICATIONS

The present application is related to the following applications which are assigned to the same assignee and filed on the same date as the present application, and are hereby incorporated herein by reference:

"Bi-directional Stack in a Linear Memory Array, U.S. application Ser. No. 09/671,513 now abandoned" and "Split Bi-directional Stack in a Linear Memory Array, U.S. application Ser. No. 09/667,751."

BACKGROUND OF THE INVENTION

1. Technical Field

The present invention is related generally to an improved data processing system and, more particularly, to an improved first in last out data structure within a memory array.

2. Description of Related Art

A stack or First In Last Out (FILO) data structure is used in many computer applications. Often multiple stacks are needed in a single application and they are added as needed, because initially it is not known how many stacks will be needed. Memory in computer systems is commonly arranged as a linear array, with an application having some segment of this linear array that it will use to place multiple stacks. The way stacks are traditionally implemented is with a base and head pointer.

In a typical case, two stacks are placed at opposite ends of the memory array. One stack grows to the right and the other stack grows to the left. Each stack may grow until it hits the opposite stack coming from the opposite direction (which is referred to as a collision).

The arrangement with two stack growing toward one another from opposite ends of the array is efficient if both the stacks grow at the same rate. That is, all memory within the memory array will be consumed before a collision. However, if a third stack is needed, a problem may arise. If all three stacks grow at the same rate, the third stack grows in one direction, and the third stack is placed in the middle of the first two stacks, then the third stack will tend to collide with one of the other two stacks, before the other of the other two stacks has used all its space. The third stack could be offset in location from the center in an effort to anticipate this problem, but if the three stacks do not grow at the same rate, then the selected offset location of the third stack may not help.

In one of the related applications, these problems are addressed by one or more bidirectionally growing stacks. In another of the related applications, these problems are further addressed in stacks which are split into more than one part. Both of these inventions are useful for addressing the problems, as described, which arise in managing the space in a linear memory array, including allocation of the space. However, a need exists for a method or apparatus to manage memory having other features, which relate to aspects of these problems in a different way, and which may provide even greater adaptability in certain circumstances, particularly circumstances involving uncertain variation in growth rate of stacks.

SUMMARY OF THE INVENTION

The present invention addresses this need as follows. A storage area, with a first and second end, is provided for storing data elements. The data elements are stored in a first stack, also having a first and second end. Space in the storage area for the first stack includes a first space proximate the first end of the first stack, and a second space proximate the second end of the first stack. The storing of one of the data elements in the first stack includes selecting between storing in the first space or the second space, responsive to the relative sizes of the two spaces.

In another aspect, data elements are stored in the storage area in a second stack. Space available in the storage area for data elements of the second stack includes the above mentioned first and second spaces, that is, the space proximate the first end of the first stack, and the space proximate the second end of the first stack. Storing in the second stack includes selecting between storing in the first or second space, responsive to the relative sizes of the two spaces.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 1A through 1C illustrate the storage area with three stacks as successive data elements are added.

FIG. 6 illustrates, in flow diagram form, an algorithm for popping a data element.

DETAILED DESCRIPTION OF THE PREFERRED EMBODIMENT

Figure 1C:
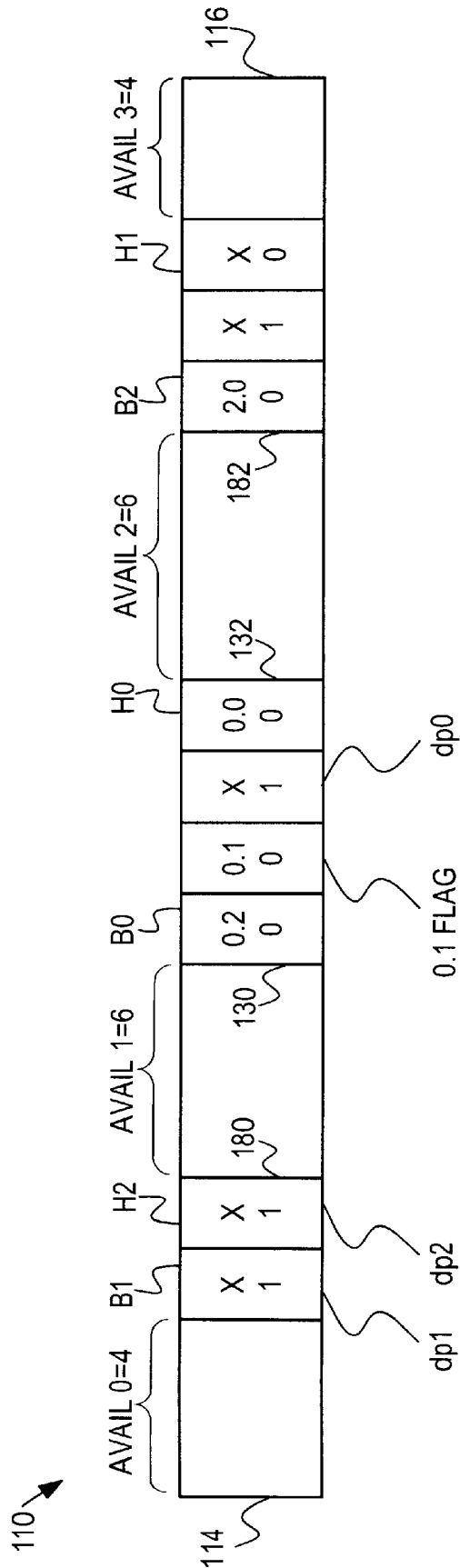

Herein, the term "array" refers to a memory storage space (aka area) of limited size having discrete storage elements. Inherently, the storage elements of the array have respective locations with respect to one another. The term "linear array" refers to such a storage area wherein the storage element locations in the array are defined in a linear fashion. That is, the elements of the array may be thought of as being stacked up in a single file line. Accordingly, each element may be uniquely identified according to its location along the "line," and the limited size, linear array may be referred to as being bounded by a first and second end of the line, such as a "right end" and a "left end," for example. Thus, a storage element of the linear array may be referred to as being located "toward the right end" or "toward the left end" along the line with respect to another storage element. More succinctly, a storage element of the linear array may be referred to as being "to the right of" or "to the left of" another storage element of the linear array.

Also, a set of data elements stored in the array may be referred to and managed as an individual "stack" within the array, that is, a set of data elements stacked up in a single file line. The stack may be said to "grow" as succesive data elements are added to the stack. If there are no discontinuities of the data elements in a first stack, e.g., there are no data elements of a second stack interposed betwen any of the data elements of the first stack, then it may be said that the first stack has only a first and second end. (If a stack does have discontinuities, then the stack may have more than one end.) Herein, a reference to a second stack having data elements located "proximate an end of" or "on an end of" a first stack does not necessarily imply that any of the second stack's data elements abut an end of the first stack, but includes an arrangement wherein some of the second stack's data elements are located between the end of the first stack and a corresponding end of the storage area.

Referring now to FIG. 1A, the storage area 110 is shown with three stacks, i.e., stack 0, stack 1 and stack 2. The storage area is shown having 29 storage elements, numbered 0 through 28, which are effectively aligned in linear fashion, with a first end 114 of the storage area being at element 0 and a second end 116 being at element 28. All three stacks have respective head pointers, H0, H1 and H2, and base pointers, B0, B1 and B2, as shown. The stacks may grow bidirectionally.

Stack 0 has a dead element located in storage element 14, in the central region of the storage area. Stack 0 has a left end 130 and a right end 132, and has a direction pointer flag dp0, located in the dead element, which is initially set at a value of "1," indicating an initial rightward growth direction, i.e., from the right end 132. This direction pointer will be toggled to manage the direction in which the head is moved with each push or pop.

Stack 1 is split into two portions, one portion on the left end of stack 0 and one on the right end. Stack 1 has a dead element at storage element 4, on the left end of stack 0, and a dead element at storage element 24, on the right end of stack 0. Initially, the base pointer of stack 1 is at the left dead element, and the head is at the right. Since this stack grows outward and the head is initially at the right of the base, the next element to be added, i.e., the first data element, will be to the right of the head pointer, so the dead element at the base has a direction pointer flag dp1 initially set to "1," indicating rightward growth from the current head. The dead element initially at the head does not need to have a direction pointer, so the location where a value would be shown instead indicates no value.

Stack 2 is also split into two portions, one portion on the left end of stack 0 and one on the right end, as shown. Initially the left portion of Stack 2, which defines the initial left end 180 of stack 2, consists of a single, dead element at storage element 5. Also, the initial right portion, which defines the initial right end 182 of stack 2, consists of a single, dead element at storage element 23. Initially, the base pointer of stack 2 is at the left dead element, and the head is at the right. Since this stack grows inward and the head is initially at the right of the base, the next element to be added, i.e., the first data element, will be to the left of the head pointer, so the dead element at the base has a direction pointer flag dp2 initially set to "0," indicating leftward growth from the current head. The dead element at the head does not need to have a direction pointer, so the location where a value would be shown instead indicates no value.

The spaces between the respective stacks or stack portions are available for growth of the stacks. That is, space "avail 0," initially 4 storage elements in size, is available for growth from the left end of stack 1. Available for growth from the left end of stack 2 and the left end of stack 0, is space "avail 1," which is initially 8 storage elements in size. Available for growth from the right ends of stack 0 and stack 2, is space "avail 2," which is also initially 8 storage elements in size. Available for growth from the right end of stack 1, is space "avail 3," which is initially 4 storage elements in size.

Instructions for initializing the storage area and the stacks, would include, for example, initializing pointers for the storage area, indicating which elements are at the left and right end of the storage area, and for the stacks as shown in FIG. 1A.

Referring now to FIG. 1B, the storage area is shown after two data elements 0.0 and 0.1 have been added to stack 0, and one data element 2.0 has been added to stack 2.

The direction pointer flag dp0 now has a value "1." That is, before the first data element 0.0 was added to stack 0, the dp0 had a value "1." Then, after adding first data element 0.0 to stack 0, but before adding second data element 0.1 to stack 0 (not shown), dp0 was toggled to a value "0." Then, after adding second data element 0.1 to stack 0, as shown in FIG. 1B, dp0 was toggled again to the value shown, i.e., "1." In similar fashion, after one data element has been added to stack 2, the direction pointer dp2 is shown in FIG. 1B having a value "1."

Below each of the three data elements 0.0, 0.1 and 2.0 are shown flags for the respective data elements. For the stacks of the illustrated embodiment there is a default growth pattern, according to which data elements are added at one end and then the other, alternating right-left-right-etc. If, for a particular data element the growth deviates from this pattern, the flag for the data element is set to track the deviation.

For the example, it is assumed that the data elements are added in the sequence 0.0, 0.1, then 2.0, so that when element 0.0 was added at the right end of stack 0 the space available on each side of stack 0 was equal, and when element 0.1 was added at the left end of stack 0 the space available on the left side of stack 0 was bigger than on the right, and when element 2.0 was added to stack 2, the space available to the left of the right portion of stack 2, i.e., space "avail 2," was equal to the space available to the right of the left portion of stack 2, i.e., space "avail 1." Due to this particular sequence of adding data elements, the right-left-right sequence of adding data to a stack has not been violated, so flag 0.0, flag 0.1 and flag 2.0 all have the value "0." With these three data elements having been added, space avail 1 has now been reduced to 7 remaining storage elements in size, while space avail 2 has now been reduced to 6.

FIG. 1C illustrates that a next data element 0.2 has been added to stack 0 at the left end of the stack instead of the right end, deviating from the ordinary right-left-right sequence. This deviation occurred because at the time of adding the data element 0.2, the space avail 1, on the left end was bigger than the the space avail 2 on the right end of stack 0. Note also, that the flag for data element 0.1 has been set to "1," indicating the deviation in sequence. Also, dp0 has not been toggled from "1" to "0" with the addition of data element 0.1 to stack 0, as will be further explained below, in connection with the algorithm for pushing a data element to a stack.

Figure 2:
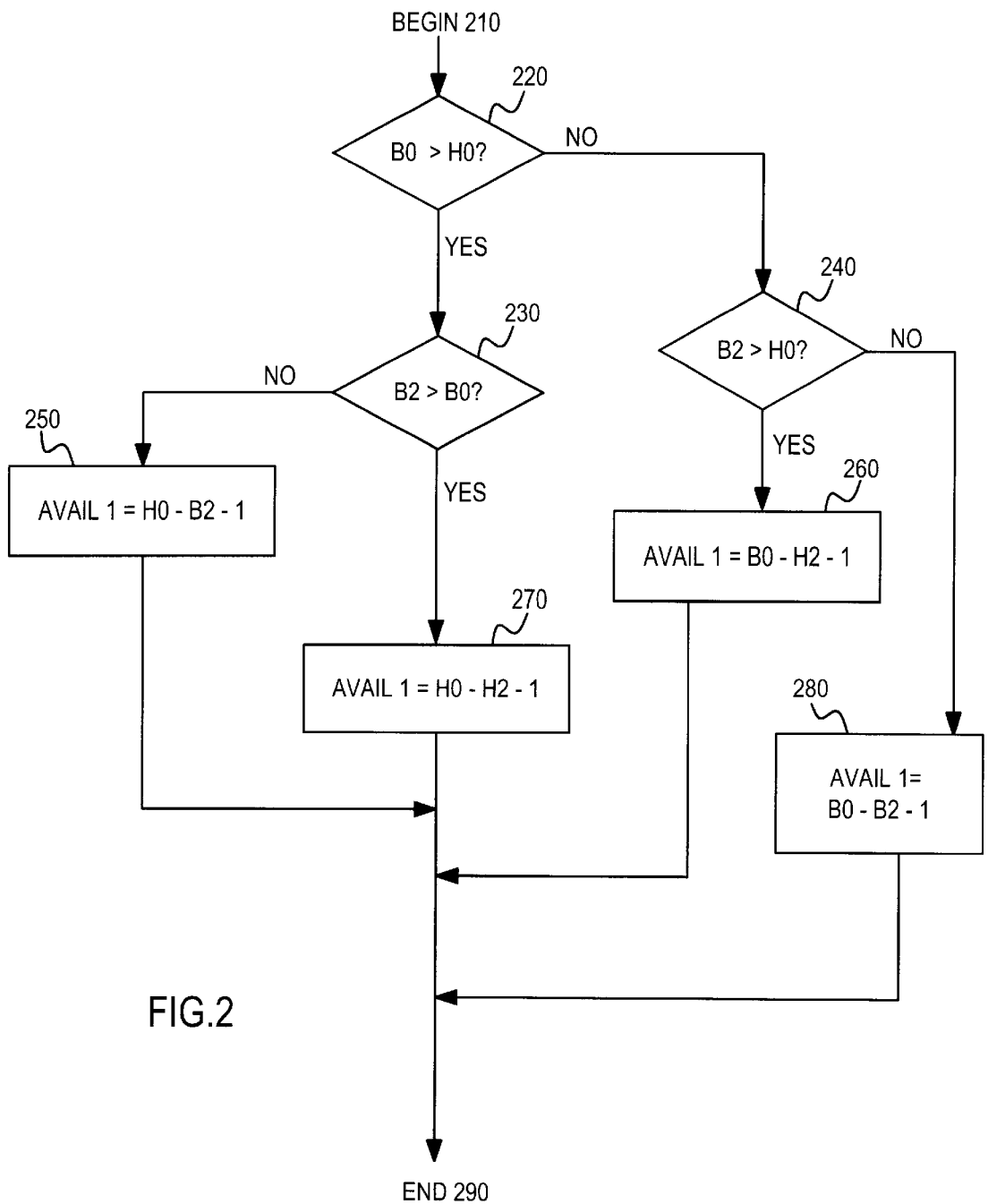
FIG. 2 illustrates, in flow diagram form, an algorithm for calculating the space available for adding data elements to space "avail 1," which stack 0 and stack 2 share to the left of stack 0 and the right of the leftward portion of stack 2.

Referring now to FIG. 2, an algorithm is shown for calculating the space available for adding data elements to space "avail 1," which stack 0 and stack 2 share to the left of stack 0 and to the right of the leftward portion of stack 2.

The algorithm begins at 210. Then, at 220, the base of stack 0 is compared to the head. If the base is to the right of the head, i.e., points to a higher order location in the storage area, then the base of stack 2 is compared to the base of stack 0, at 230. If the base of stack 0 is to the left of the head of stack 0, then the base of stack 2 is compared to the head of stack 0, at 240.

If the head of stack 0 is "bigger than," i.e., points to a higher order location than, the base of stack 0 (block 220) then the space avail 1, to the left of stack 0 and to the right of stack 2's leftward portion, is calculated as one less than the difference between the stack 0 head and the stack 2 base (block 250) or the stack 2 head (block 270), depending on whether the base of stack 2 is bigger than the base of stack 0 (block 230).

If the head of stack 0 is bigger than the base of stack 0 (block 220), then the space avail 1 is calculated as one less than the difference between the stack 0 base and the stack 2 head (block 260), or the stack 2 base (block 280), depending on whether the base of stack 2 is bigger than the head of stack 0 (block 240). After calculating avail 1, the algorithm ends at 290.

Figure 3:
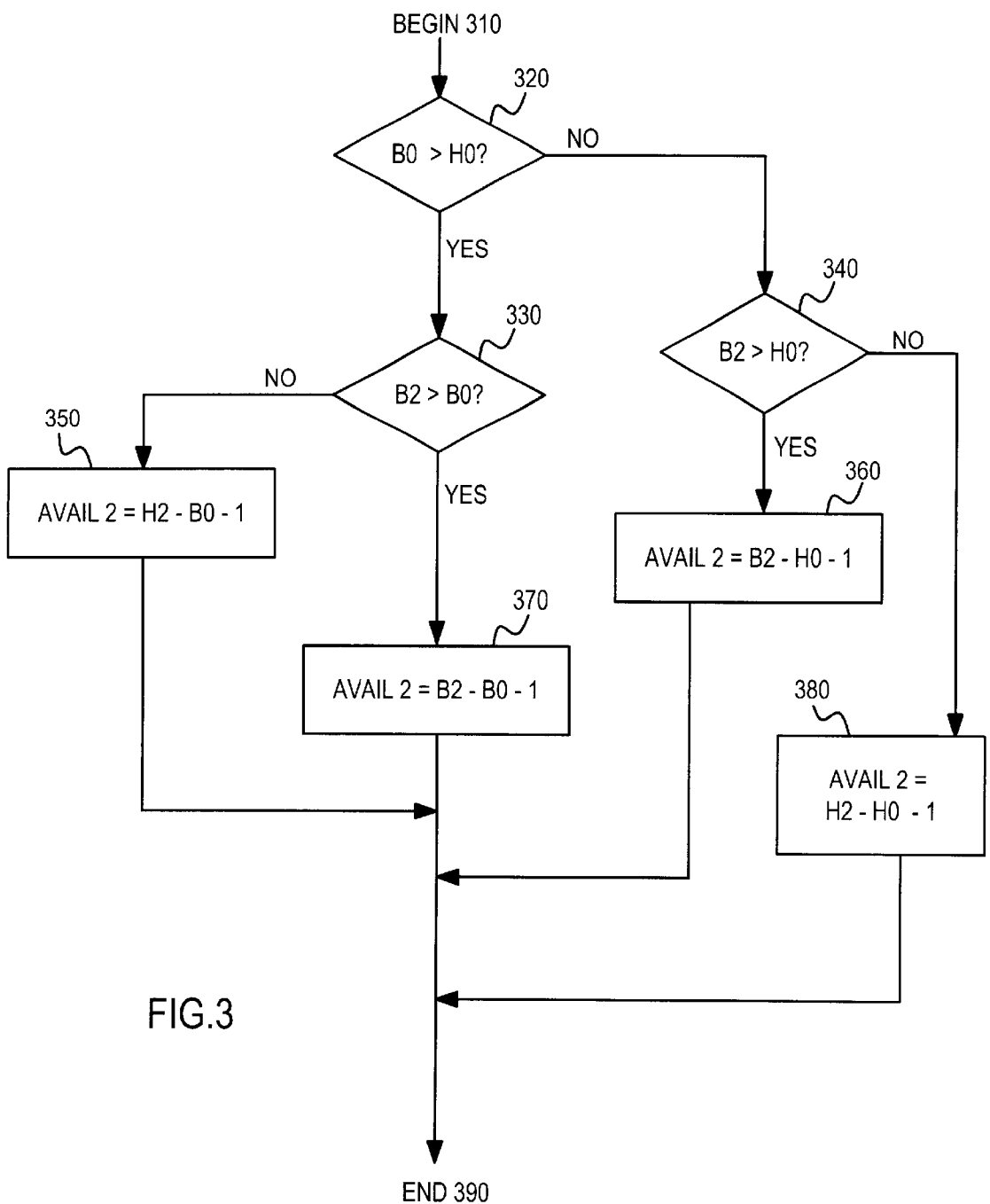
FIG. 3 illustrates, in flow diagram form, an algorithm for calculating the space available for adding data elements to space "avail 2," which stack 0 and stack 2 share to the right of stack 0 and to the left of the rightward portion of stack 2.

Referring now to FIG. 3, an algorithm is shown for calculating the size of space avail 2, which is to the right of stack 0 and to the left of the rightward portion of stack 2. The algorithm begins at block 310. At block 320 the base of stack 0 is compared to its head. Depending on the outcome of that comparison, the base of stack 2 is compared to either the base of stack 0 (block 330) or the head of stack 0 (block 340).

If the base of stack 0 is bigger than its head (block 320), then the space avail 2 is calcluated as one less than the difference between the base of stack 0, and either the head of stack 2 (block 350) or the base of stack 2 (block 370), depending on whether the base of stack 2 is bigger than the base of stack 0 (block 330).

If the head of stack 0 is bigger than its base, then the space avail 2 is calculated as one less than the difference between the head of stack 0 and either the stack 2 base (block 360) or head (block 380), depending on whether the stack 2 base is bigger than the stack 0 head (block 340).

Figure 4:
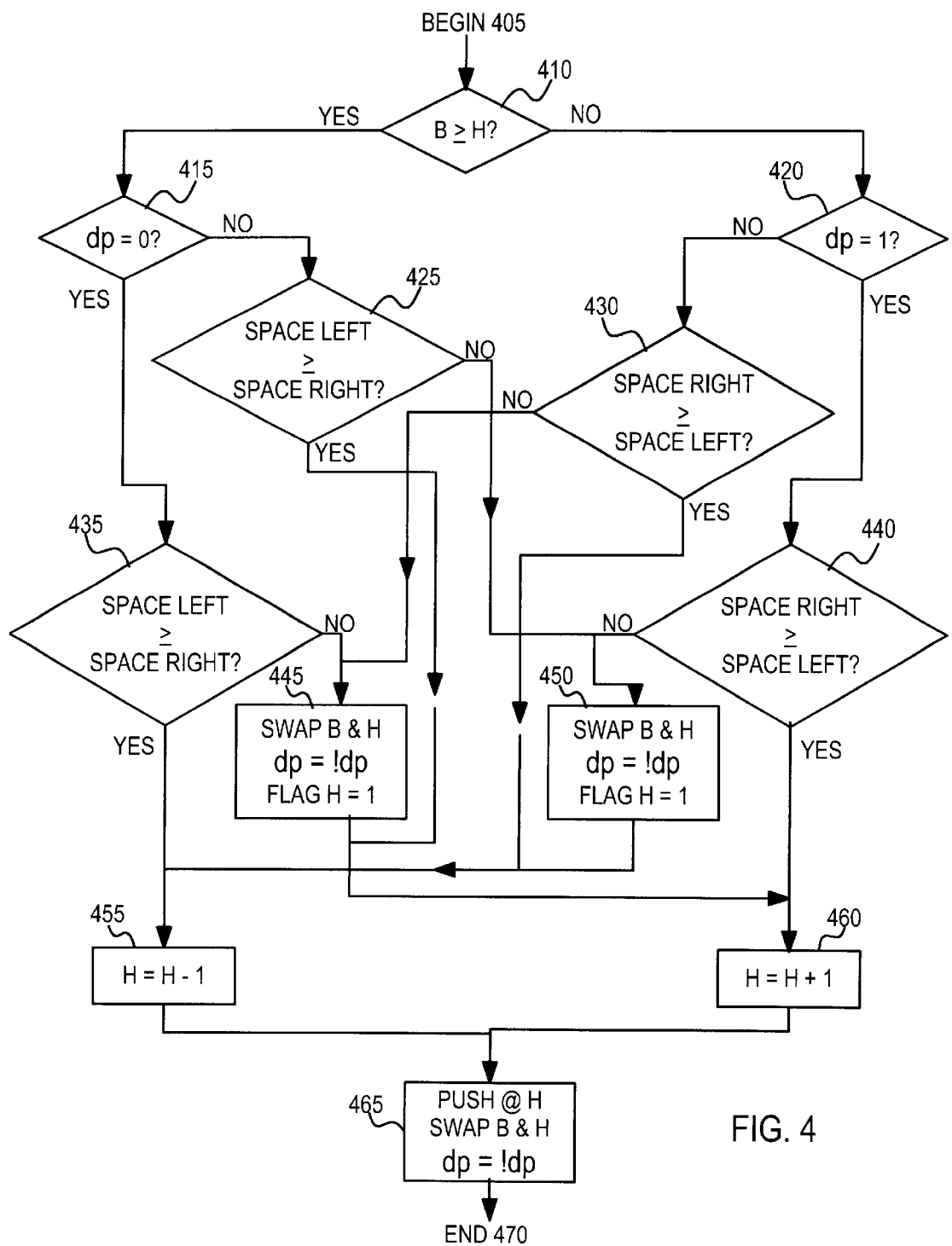
FIG. 4 illustrates, in flow diagram form, an algorithm for determining whether to push a data element into space to the left or the right of a stack.

Referring now to FIG. 4, an algorithm is shown for determining whether to push a data element into space "avail 1" or space "avail 2." The algorithm applies to pushing data to either stack 0 or stack 2, which share the spaces avail 1 and avail 2. The algorithm begins at block 405.

The base and head pointers are initially compared at block 405. Next, the pointer for the stack is examined. This is done at block 415, for a case where the base is to the right of the head, or at block 420, for a case where the base is to the left of the head, as it is for stack 0 in FIG. 1B, for example.

If the direction pointer is 0 at 415, this indicates that the stack is outward growing, and currently set to grow to the left with the next push. If the dp is 1 at 415, this indicates an inward growing stack, currently set to grow to the right with the next push.

If the direction pointer is 1 at 420, this indicates the stack is outward growing and currently is set to grow to the right with the next push. If the dp is 0 at 420, this indicates inward growing and set to grow left.

Next, the sizes of the leftward and rightward spaces are compared, at 425, 430, 435 or 440 depending on the earlier outcomes. For the case of i) an outward growing stack, set to grow left, if the leftward available space is the same as or bigger than the rightward available space, at 435, or ii) an inward growing stack, set to grow left, if the right space is the same as or bigger than the left space, at 430, no change is needed in the growth pattern, so the head pointer is decremented at 455. For i) an outward growing stack, set to grow right, if the right space is the same as or bigger than the left, at 440, or ii) an inward growing stack, set to grow right, if the left avaialble space is the same as or bigger than the right, at 425, the head pointer is incremented at 460.

For the case of i) an outward growing stack, set to grow left, if the available space to the left is smaller than the right, at 435, or ii) an inward growing stack, set to grow left, if the rightward available space is smaller than the left, at 430, the base and head pointers are swapped, the direction pointer is inverted and the flag is inverted at the location now pointed to by the head pointer, at 445. Then, after 445, the head pointer is incremented at 460.

For the case of i) an outward growing stack, set to grow right, if the available right space is smaller than the left, at 440, or ii) an inward growing stack, set to grow right, if the available left space is smaller than the right, at 425, the base and head pointers are swapped, the direction pointer is inverted and the flag is inverted at the location now pointed to by the head pointer, at 450. Then, after 450, the head pointer is decremented at 455.

After the head pointer has been incremented or decremented at 460 or 455 respectively, the following occurs at 465: i) the data is pushed at the location pointed to by the head pointer, ii) the base and head pointers are swapped, and iii) the direction pointer is inverted at block 465. The algorithm then ends at 470.

Referring now to FIG. 6, an algorithm is shown for popping data from a stack, beginning at 610. First at 620 the base and head pointers are swapped, the direction pointer is inverted, and the data pointed to by the head pointer is popped. Next, at 630, the direction pointer is examined. If the dp is 0 then the head pointer is incremented at 640. Otherwise, the head pointer is decremented at 650. Then the flag at the data element pointed to by the head pointer is examined at 660. If the flag is 1, the base and head pointers are swapped, and the direction pointer is inverted at 670, and the algorithm ends at 680. If the flag is not 1, the algorithm ends immediately at 680.

Figure 5:
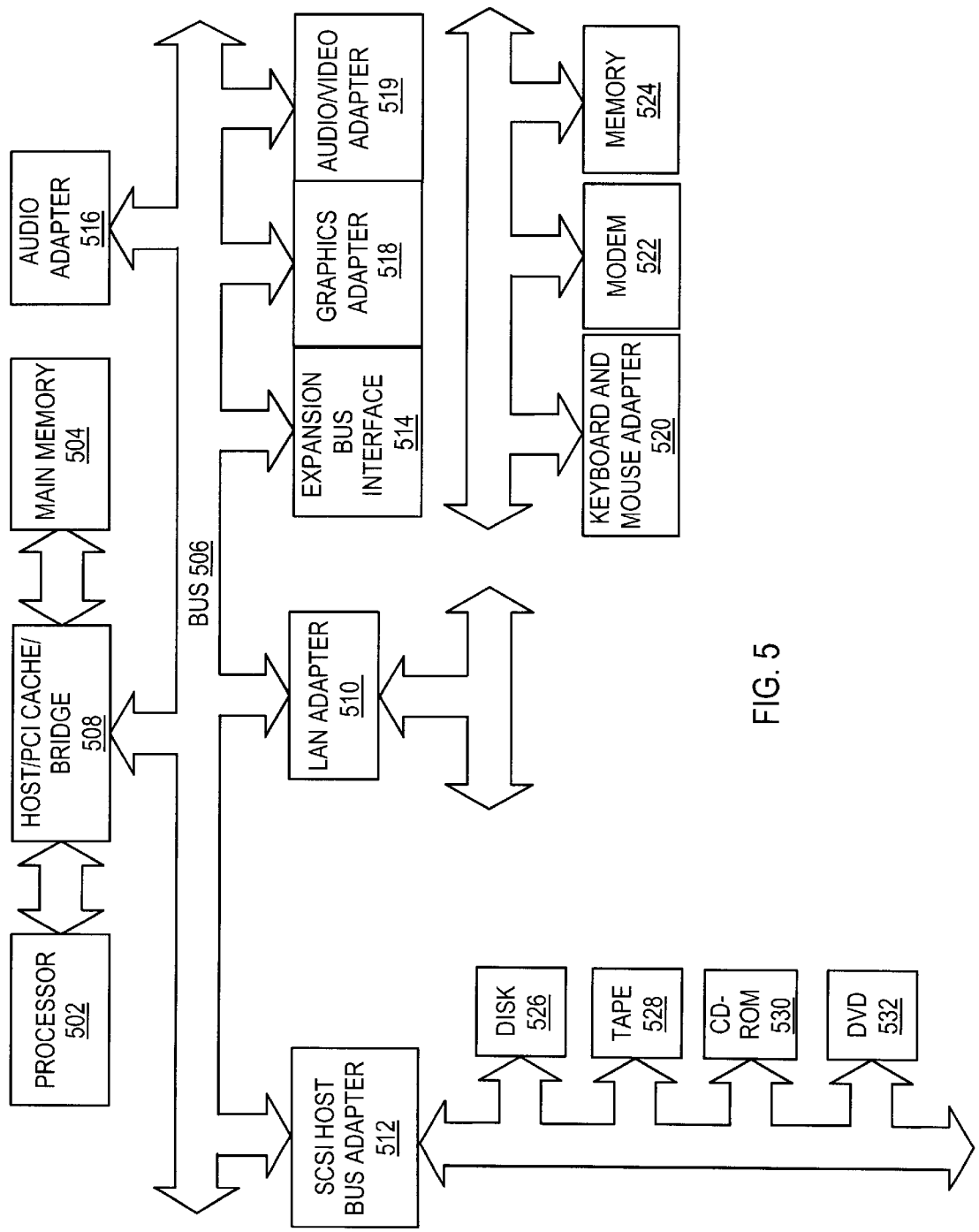
FIG. 5 illustrates, in block diagram form, a system for implementing the invention.

With reference now to FIG. 5, a block diagram of a data processing system in which the present invention may be implemented is illustrated. Data processing system 500 employs a peripheral component interconnect (PCI) local bus architecture. Although the depicted example employs a PCI bus, other bus architectures, such as Micro Channel and ISA, may be used. Processor 502 and main memory 504 are connected to PCI local bus 506 through PCI bridge 508. PCI bridge 508 may also include an integrated memory controller and cache memory for processor 502. Additional connections to PCI local bus 506 may be made through direct component interconnection or through add-in boards. In the depicted example, local area network (LAN) adapter 510, SCSI host bus adapter 512, and expansion bus interface 514 are connected to PCI local bus 506 by direct component connection. In contrast, audio adapter 516, graphics adapter 518, and audio/video adapter (A/V) 519 are connected to PCI local bus 506 by add-in boards inserted into expansion slots. Expansion bus interface 514 provides a connection for a keyboard and mouse adapter 520, modem 522, and additional memory 524. In the depicted example, SCSI host bus adapter 512 provides a connection for hard disk drive 526, tape drive 528, CD-ROM drive 530, and digital video disc read only memory drive (DVD-ROM) 532. Typical PCI local bus implementations will support three or four PCI expansion slots or add-in connectors.

An operating system runs on processor 502 and is used to coordinate and provide control of various components within data processing system 500 in FIG. 5. The operating system may be a commercially available operating system, such as OS/2, which is available from International Business Machines Corporation. "OS/2" is a trademark of International Business Machines Corporation. An object oriented programming system, such as Java, may run in conjunction with the operating system, providing calls to the operating system from Java programs or applications executing on data processing system 500. Instructions for the operating system, the object-oriented operating system, and applications or programs are located on a storage device, such as hard disk drive 526, and may be loaded into main memory 504 for execution by processor 502.

Those of ordinary skill in the art will appreciate that the hardware in FIG. 5 may vary depending on the implementation. For example, other peripheral devices, such as optical disk drives and the like, may be used in addition to or in place of the hardware depicted in FIG. 5. The depicted example is not meant to imply architectural limitations with respect to the present invention. For example, the processes of the present invention may be applied to multiprocessor data processing systems.

Although the present invention has been described primarily with reference to modifications necessary to change a uni-directionally growing dead element stack into a bi-directionally growing dead element stack, ones skilled in the art will recognize that the present invention may be applied to create other types of bi-directionally growing stacks. For example, the present invention may be applied to create a bi-directionally growing used element stack rather than a dead element stack. In a used element stack, the memory location that both the head and base pointer point to prior to beginning the stack is used to store an element. However, in a dead element (or empty element) stack, as described above, the memory location in which both the head pointer and base pointer originate before the stack begins, is not used to store an element. Other types of stacks may be modified as well to create bi-directionally growing stacks. Thus, the present invention is not limited to dead element stacks.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for managing storage of data elements, comprising the steps of:
   providing a storage area for storing data elements, the storage area having a first and second; and
   storing data elements in a first stack in the storage array, wherein the stack consists of a single stack, the stack having a first end and a second end, wherein space available in the storage area for the first stack includes a first space proximate a first end of the first stack, and a second space proximate a second end of the first stack, and wherein the storing of one of the data elements in the first stack includes the step of:
      selecting between i) storing the one of the data elements in the first space and ii) storing the one of the data elements in the second space, the selection being responsive to the relative sizes of the first and second spaces.

2. The method of claim 1, comprising the step of:
   storing data elements in a second stack in the storage array, wherein space available in the storage area for the storing of data elements of the second stack includes the first space proximate the first end of the first stack, and the second space proximate the second end of the first stack, and wherein the storing of one of the data elements in the second stack includes the step of:
      selecting between i) storing the one of the second stack data elements in the first space and ii) storing the one of the second stack data elements in the second space, the selection being responsive to the relative sizes of the first and second spaces.

3. The method of claim 2, comprising the step of:
   storing, for such a one of the data elements being stored in one of the stacks, an indication of whether there has been a deviation from a certain predetermined sequence of storing the data elements.

4. The method of claim 3, wherein the indication is a single bit.

5. The method of claim 4, comprising the step of:
   storing for such a stack, an indication of whether the stack will grow toward the stack's first end or second end with the addition to the stack of a next data element.

6. A computer program product in a computer readable media for use in a data processing system for managing storage of data elements, wherein the data elements are stored in a storage area having a first storage area end and a second storage area end, including storing the data elements in a first stack in the storage array, wherein the stack consists of a single stack, the stack having a first end and a second end, wherein space available in the storage area for the first stack includes a first space proximate a first end of the first stack, and a second space proximate a second end of the first stack, the computer program product comprising:
   first instructions for determining relative sizes of a first space proximate a first end of the first stack, and a second space proximate a second end of the first stack; and
   second instructions for storing one of the data elements in the first stack, the second instructions including selecting between i) storing the one of the data elements in the first space and ii) storing the one of the data elements in the second space, the selection being responsive to the relative sizes of the first and second spaces.

7. The computer program product of claim 6, wherein data elements are stored in a second stack in the storage array, and space available in the storage area for the storing one of the data elements of the second stack includes the first space proximate the first end of the first stack, and the second space proximate the second end of the first stack, the computer program product comprising:

third instructions for storing one of the data elements in the second stack, the third instructions including instructions for selecting between i) storing the one of the second stack data elements in the first space and ii) storing the one of the second stack data elements in the second space, the selection being responsive to the relative sizes of the first and second spaces.

8. The computer program product of claim 7, wherein the second and third instructions include respective instructions for storing, for such a one of the data elements being stored in one of the stacks, an indication of whether there has been a deviation from a certain predetermined sequence of storing the data elements.

9. The computer program product of claim 8, wherein the indication is a single bit.

10. The computer program product of claim 9, wherein the second and third instructions include respective instructions for storing, for such a stack, an indication of whether the stack will grow toward the stack's first end or second end with the addition to the stack of a next data element.

11. A system for managing storage of data elements, the system comprising:

means for providing a storage area for storing data elements, the storage area having a first and second end; and means for storing data elements in a first stack in the storage array, wherein the stack consists of a single stack, the stack having a first end and a second end, wherein space available in the storage area for the first stack includes a first space proximate a first end of the first stack, and a second space proximate a second end of the first stack, and wherein the means for storing one of the data elements in the first stack includes:

means for selecting between i) storing the one of the data elements in the first space and ii) storing the one of the data elements in the second space, the selection being responsive to the relative sizes of the first and second spaces.

12. The system of claim 11, comprising:

means for storing data elements in a second stack in the storage array, wherein space available in the storage area for the storing of data elements of the second stack includes the first space proximate the first end of the first stack, and the second space proximate the second end of the first stack, and wherein the means for storing of one of the data elements in the second stack includes:

means for selecting between i) storing the one of the second stack data elements in the first space and ii) storing the one of the second stack data elements in the second space, the selection being responsive to the relative sizes of the first and second spaces.

13. The system of claim 12, comprising:

means for storing, for such a one of the data elements being stored in one of the stacks, an indication of whether there has been a deviation from a certain predetermined sequence of storing the data elements.

14. The system of claim 13, wherein the indication is a single bit.

15. The system of claim 14, comprising:

means for storing for such a stack, an indication of whether the stack will grow toward the stack's first end or second end with the addition to the stack of a next data element.

* * * * *